United States Patent [19]

Corley et al.

[11] Patent Number: 4,530,625
[45] Date of Patent: Jul. 23, 1985

[54] HYDRAULIC STOP

[75] Inventors: John E. Corley, St. Charles; Charles M. Andert, Florissant; Joseph H. Geen, St. Louis; Wesley G. Wells, Hazelwood; Russell D. Lark, O'Fallon, all of Mo.

[73] Assignee: McDonnell Douglas Corporation, Long Beach, Calif.

[21] Appl. No.: 593,577

[22] Filed: Mar. 26, 1984

[51] Int. Cl.³ ............................................. B23B 49/00
[52] U.S. Cl. ................................. 408/14; 10/141 H; 408/10; 408/73; 408/142
[58] Field of Search ............ 408/5, 7, 8, 10, 11, 408/12, 14, 15, 73, 74, 130, 146, 238, 239 R, 241 S, 84, 141, 142, 13; 279/16; 10/89 F, 141 H, 135 R

[56] References Cited

U.S. PATENT DOCUMENTS 2,967,441 1/1961 Miles ........................................ 408/73
4,273,481 6/1981 Corley et al. ........................... 408/14

Primary Examiner—Gil Weidenfeld
Assistant Examiner—Daniel W. Howell
Attorney, Agent, or Firm—John P. Scholl; George W. Finch; Donald L. Royer

[57] ABSTRACT

An improved hydraulic stop for use with drilling and countersinking tools. The stop limits the penetration of the tool into the workpiece by dwelling at a pre-set depth while the machine spindle continues to travel (feed) through a hydraulic override system.

A safety relief valve, pre-set to a safe load, will permit the device to collapse or override if the hydraulic or mechanical override system should fail.

4 Claims, 5 Drawing Figures

HYDRAULIC STOP

The Government has rights in this invention pursuant to Contract No. F33657-79-0779 awarded by the Department of the Air Force.

BACKGROUND OF THE INVENTION

In certain operations involving numerical control machines for drilling, cutting, milling and grinding operations, it is desirable to have a device which can control the depth of the cut of the tool in the workpiece independent of the numerical control machine. This improved hydraulic stop is designed for use where the exact location of the surface of the workpiece is unknown with respect to the program start point of a numerical control machine. The improved hydraulic stop limits penetration of the cutter and also provides a safety device to assure unit will collapse at a safe pressure if override mechansim should fail.

Prior art hydraulic stop covered by U.S. Pat. No. 4,273,481 could be used to limit penetration of a drill bit. This improved hydraulic stop has reduced complexity and size. The reduction in size results in a shorter, more rigid tool, with improved tool concentricity.

SUMMARY OF THE INVENTION

An improved hydraulic stop for attachment to a numerical control machine for use with a drilling or cutting tool. The improved hydraulic stop senses the location of the workpiece surface and limits the penetration of the cutting tool into the workpiece as well as providing for spindle override. The improved hydraulic stop utilizes hydraulic fluid as the tool stiffener on the cutting stroke. When the sensing mechanism contacts the surface of the workpiece it offsets a ball from its seat permitting the release of the stiffening fluid and the collapse of the hydraulic stop. The collapse of the tool limits penetration of the cutter into the workpiece. When the cutter is withdrawn from the workpiece and the sensing mechanism disengages, the stiffening fluid is recycled within the stop and the ball check value is reset providing fluid stiffener for the next cutting stroke.

DESCRIPTION OF THE PREFERRED EMBODIMENT

Figure 1:
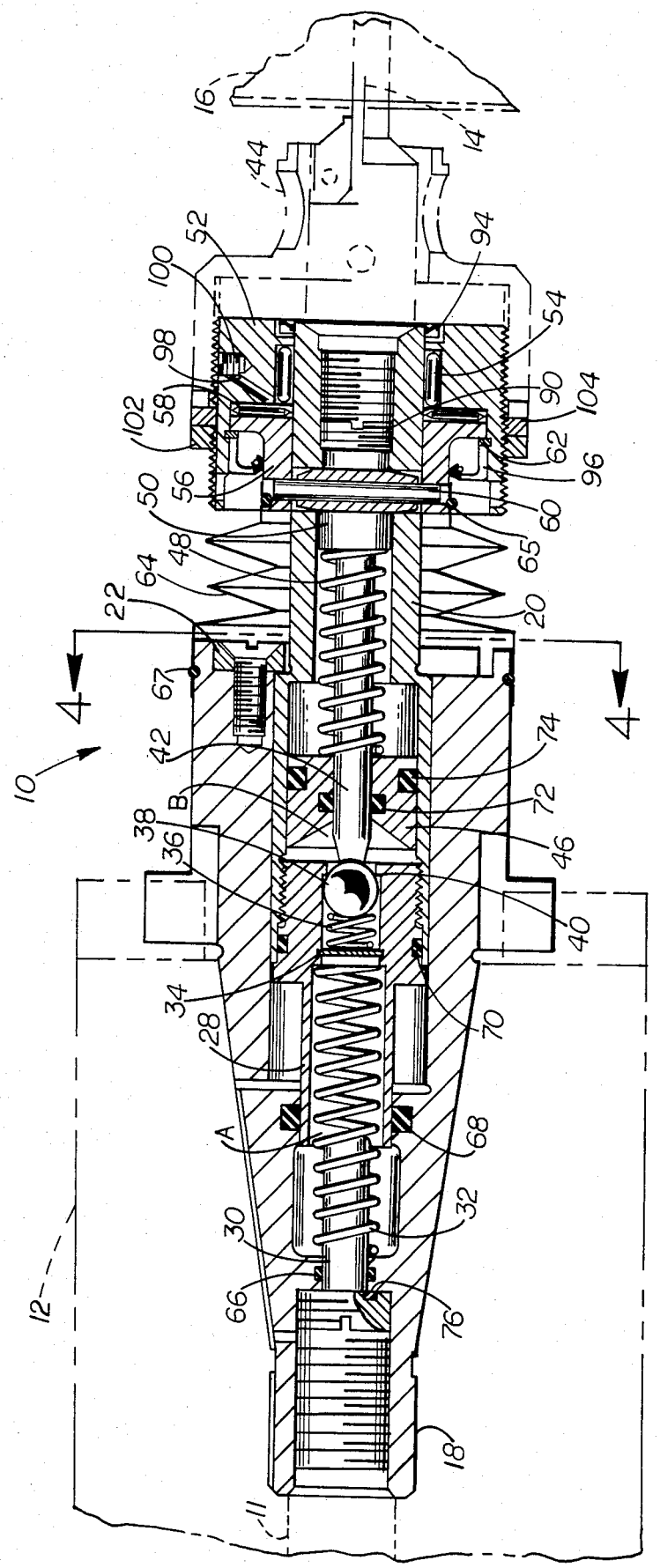
FIG. 1 is a section view through the improved hydraulic stop in a cutting mode. The stop is attached to the spindle of a numerical control machine and it is holding a drill/countersink tool which tool is engaging a workpiece.

An improved hydraulic stop 10 shown in FIG. 1 is held in the spindle 12 of a numerical control machine by a drawbar 11. Installed in the hydraulic stop 10 is a drill/countersink tool 14 which is cutting a hole in a workpiece 16.

Figure 2:
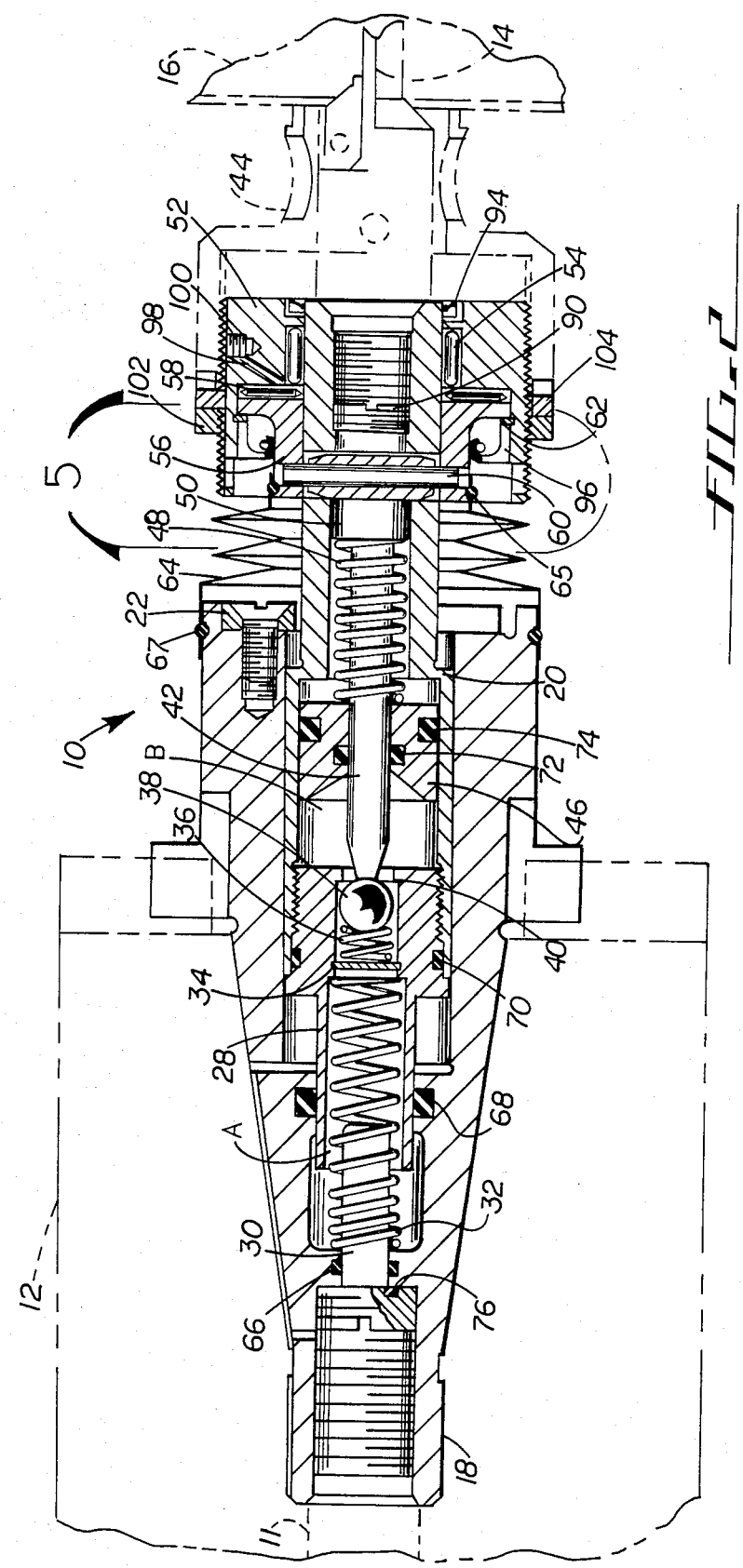
FIG. 2 is a section view of the improved hydraulic stop of FIG. 1 in the release or collapse mode.

The body 18 of the stop 10 is gripped by the spindle 12 of the numerical control machine. The drill/countersink tool 14 is threaded into the sliding member 20. This sliding member 20 is concentric to and moves within the body 18 of the stop 10. The sliding member 20 is held within the body 18 by end cap 22 (anti-rotation slide plate) (see FIGS. 1, 2 and 3). This end cap 22 is attached to the body by three screws 24, and due to flat sides 26 on the sliding member 20 and the mating of these sides with flat surfaces on end cap 22, the sliding member 20 rotates with the body 18.

Within the body 18 the sliding member 20 is in threaded engagement with a first chamber member 28. The first chamber member 28 engages the inside of the body 18 and forms fluid chamber A.

A safety relief pin 30 (FIGS, 1 and 3) is threaded into the body and axially aligns and holds a tool reset spring 32 within chamber A. Tool reset spring 32 as aligned by safety relief pin 30 is compressed between the first chamber member 28 and body 18 of the tool 10. This coiled tool reset spring 32 is under compression and attempts to expand chamber A. Bearing against the side of the first snap retaining ring 34 is a ball check spring 36 which forces ball 38 into a ball seat 40 located in first chamber member 28. Ball check actuating pin 42 engages and bears against ball 38 and will unseat ball 38 from its seat 40 when the depth sensor 44 encounters the workpiece 16. A second chamber member 46 moves within the sliding member 20 and together with the first chamber member 28 defines chamber B. Chamber reset spring 48 is a coil spring which surrounds ball check actuating pin 42. Chamber reset spring 48 is compressed and between the second chamber member 46 and shoulder 50 on ball check actuating pin 42. Chamber reset spring 48 forces a second chamber member 46 to the left in FIG. 2 and decrease the size of chamber B.

Depth sensor 44 rotates with body 18 until it contacts the workpiece 16. Depth sensor 44 is threaded on rotation cylinder member 52. Rotating cylinder member 52 is mounted by needle bearings 54 on sliding member 20 and needle bearings 58 on shifting pin holding member 56. Retaining ring 62 holds rotating cylinder member 52 on shifting pin holding member 56. Rotating cylinder member 52 will rotate separate from sliding member 20 and shifting pin holding member 56 is slip fit on sliding member 20. Shifting pin 60 retains shifting pin holding members on sliding member 20 and is also an anti-rotation pin causing shifting pin holding member 56 to rotate with sliding member 20.

Figure 5:
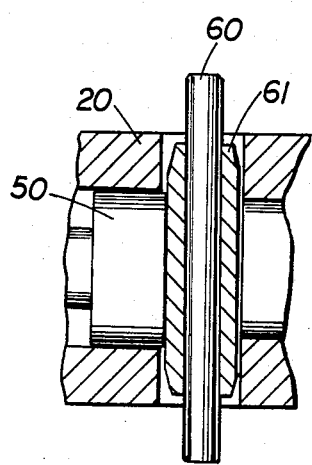
FIG. 5 is an enlarged view of the shifting pin as shown in FIG. 2.

Shifting pin 60 is held within shifting pin holding member 56 by a press fit. Shifting pin 60 passes perpendicular through the axis of rotation 59 of the improved hydraulic stop 10. Shifting pin 60 also passes through shifting pin bushing 61 (FIG. 5). An enlarged hole in the sliding member 20 FIG. 5 permits longitudinal movement of shifting pins 60 and shifting pin bushing 61 along the axis of rotation 59 to engage the shoulder 50 on ball check actuating pin 42.

Surrounding sliding member 20 is a polyurethane ribbed shroud 64 to keep dust, dirt and fluids off an exposed portion of the sliding member 20.

Several O-rings are used throughout the improved hydraulic stop to maintain fluids in their proper chambers and passages. First O-ring 66 is located in a groove in body member 18 and prevents the passage of fluids between safety valve member 30 and the body member 18. Second O-ring 68 is located in a groove in body member 18 and prevents the passage of fluid between the body member 18 and the first chamber member 28. Third O-ring 70 is located in a groove in the first chamber member 28 and prevents the passage of fluid between the shifting member 20 and the first chamber member 28. Fourth O-ring 72 is located in a groove inside of second chamber member 46 and prevents the passage of fluid between second chamber 46 member and shifting pin 42. Fifth O-ring 74 is located in a groove on the outside of second chamber 46 member and prevents the passage of fluid between the second chamber 46 member and the sliding member 20.

A sixth O-ring 76 is used in a groove cut in the head of the safety relief pin 30 and prevents fluid passing between the head 78 of safety relief pin 30 and the body of tool 18. The safety relief pin 30 contains a coil spring 80, plunger 82, ball 84 and seat 86.

A threaded plug 90 is screwed into the open end of sliding member 20 to seal the sliding member against dirt that might enter the area adjacent shoulder 50 on the ball check actuating pin 42 and shifting holding pin member 56.

A set screw 92 (FIG. 3) is also used in relief pin 30 to hold coil spring 80 against plunger 82 as well as seal off the bleeder hole in pin 30.

Grease seal 94 (FIG. 1) seals the interface between rotating cylindrical member 52 and sliding member 20. Grease seal 96 seals the interface between rotating cylindrical member 52 and shifting pin holding member 56.

A grease port 98 is drilled in rotating cylindrical member 52 so that grease may be used to lubricate needle bearings 54 and 58. A set screw 199 threads into the grease part 98 to seal the part.

Ribbed shroud 64 is held in place by O-rings 65 and 67.

To adjust the depth sensor 44 with respect to the drill counter sink tool 14 and control the depth of the cutting tool, shield ring 102 and lick ring 104 are assembled on rotating cylindrical member. Once the desired relationship between the cutting tool 14 and the depth sensor have been achieved by threading the depth sensor on rotating cylindrical member 52 lock ring 104 slides up against depth sensor. Lock ring 104 has a tongue (not shown) which slips into a longitudinal rotating cylindrical member 52 and prevents lock ring 104 rotating with respect to rotating cylindrical member. Threaded ring 102 is then tightened against lock ring 104 and depth sensor 44 and, as a result thereof, depth sensor is fixed in position with respect to rotating cylinder member 52 as well as to cutting tool 14.

In operation the numerical control machine begins its cutting stroke and the drill/countersink tool 14 begins to cut a hole in the workpiece 16. Stiffening hydraulic fluid in chamber A provides the axial interconnection between numerical control spindle 12 and the cutting drill countersink tool 14. The depth sensor 44 rotates with the stop 10 until it engages the workpiece 16 and then ceases to rotate but moves axially to the left with respect to sliding member 20 along with rotating cylindrical member 52, shifting pin holding member 56, the shifting pin 60 and ball check actuating pin 42 (FIG. 1). This leftward movement along the axis of rotation 59 of the hydraulic stop 10 unseats ball 38 from its seat and stiffening hydraulic fluid in Chamber A flows from chamber A through the ball check valve to chamber B. When the shifting fluid is released from Chamber A, the drill/countersink 14 ceases to penetrate the workpiece.

Chamber B gradually expands against the pressure of chamber reset coil spring 48, and the hydraulic countersink stop collapses limiting the penetration of the drill tool 14 into the workpiece 16 and permitting a dwell period for hole clean up by drill countersink.

The numerical control machine is scheduled to stop and reverse its direction within the overtravel provided by tool 10. When it reverses its cycle its spindle moves to the left in FIG. 2. The depth sensor 44 disengages from the workpiece 16 and ball check actuating pin 42 is forced to the right by chamber reset spring 48. Second chamber member 46 is forced to the left by chamber reset spring 48, decreasing the size of chamber B forcing hydraulic fluid through the ball check valve into chamber A. Chamber A again expands with help of incoming hydraulic fluid and compressive force of tool reset spring 32. When sliding member 20 is repositioned against end caps 22 and chamber B has been reduced to its minimum size by the equalization of hydraulic fluid pressure in Chamber A and Chamber B, ball 38 reseats in seat 40 and the improved stop is reset, and ready for the next cutting stroke. Hydraulic fluid is not once again trapped in chamber A providing shifting of the tool 10 for the cutting stroke.

Figure 3:
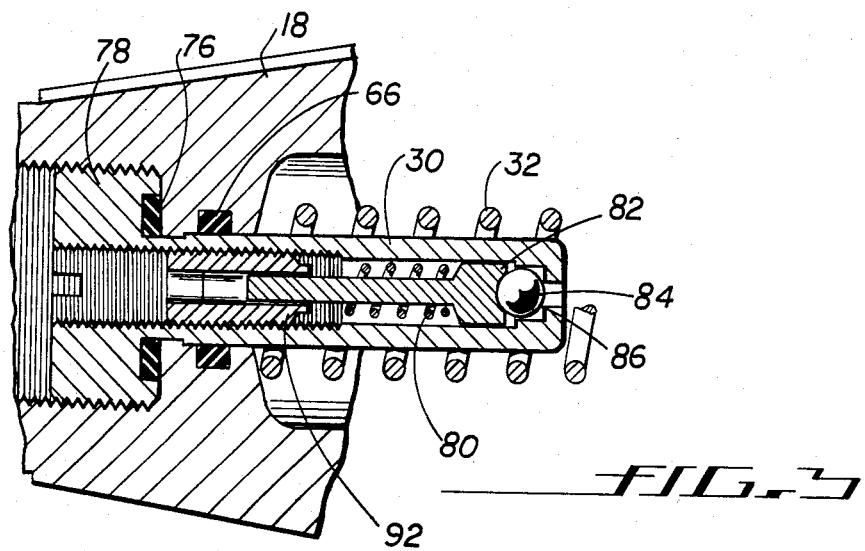
FIG. 3 depicts a portion of the hydraulic stop showing a safety relief valve which may be embodied in the improved hydraulic stop.
Figure 4:
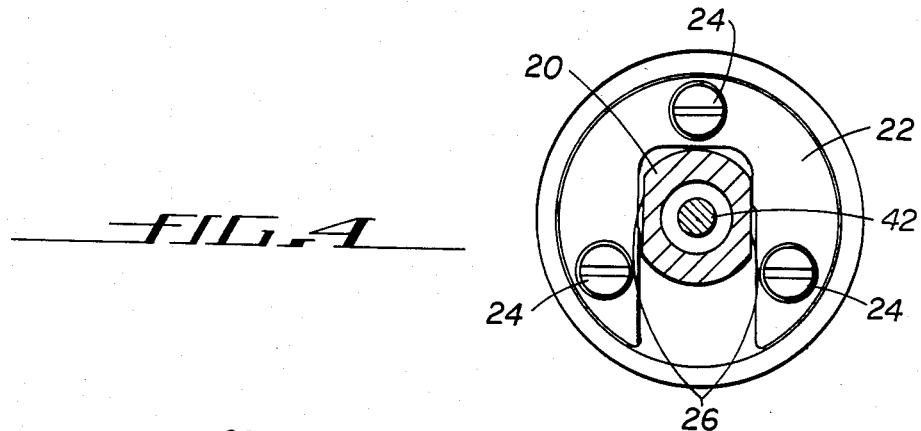
FIG. 4 is a section view of the hydraulic stop of FIG. 2 along the lines 4—4 with the collapsible ribbed shroud removed.

The improved hydraulic stop may have, as noted earlier, an optional safety feature in safety relief pin 30 (FIG. 3). Should the pressure in chamber A, due to tool malfunction exceed the thrust design limits of the part being machined, the ball check valve in the relief pin 30 will override the coil spring 80 compression, and hydraulic fluid will be released from chamber A and allowed to flow out of the tool through the relief pin.

A novel method of an improved hydraulic stop for use with drilling and countersinking tools which fulfill all of the objects and advantages sought has been shown and described therefore. Many changes, alterations, modifications and other uses and applications of the subject method will become apparent to those skilled in the art after considering this specification together with the accompanying drawings. All such changes, alterations and modifications which do not depart from the spirit and scope of the invention are deemed to be covered by the invention which is limited only by the claims which follow.

What is claimed is:

1. A hydraulic stop for use with a rotating drill and drill bit to limit the depth of penetration of the bit into the workpiece comprising:
 a body member attached at its first end to the spindle of the drill and designed to rotate about the axis of rotation of the drill, said body member having a cylindrical cavity at its second end;
 a first sliding member to fit within said cavity of said body member, said sliding member engaging and rotating with said body member and capable of movement along the axis of rotation of said body member, said sliding member having a cylindrical cavity on end within said body member and drill engaging means on the opposite end;
 a first chamber member to fit within the cavity in the body member engaging said first sliding member and capable of sliding along the axis of rotation of said drill to form with said body member a first variable fluid chamber to hold hydraulic fluid providing stiffening of said stop during the cutting stroke;

a second chamber member to fit within the cavity located in said sliding member forming a second variable fluid chamber to receive and exchange fluid with said first fluid chamber through the valve means;

valve means located in said first chamber member to control the passage of fluid from said first variable fluid chamber to said second variable fluid chamber;

sensing means engaging said valve means, said sensing means opening said valve means when said drill bit has penetrated said workpiece to the desired depth permitting passage of fluid from the first chamber to the second chamber and the collapse of said stop.

2. The hydraulic stop of claim 1 wherein said valve means is a ball check valve.

3. The hydraulic stop of claim 2 wherein said first sliding member is spring biased to enlarge said first variable fluid chamber.

4. The hydraulic stop of claim 3 wherein said ball check valve is spring biased to permit flow of fluid to second variable fluid chamber to said first variable fluid chamber in response to the force spring biased first sliding member.

* * * * *